(12) United States Patent
Benderly

(10) Patent No.: US 7,810,725 B2
(45) Date of Patent: Oct. 12, 2010

(54) MICRODOT TAG

(76) Inventor: David Benderly, 575 Main St., New York, NY (US) 10044

( * ) Notice: Subject to any disclaimer, the term of this patent is extended or adjusted under 35 U.S.C. 154(b) by 368 days.

(21) Appl. No.: 11/805,688

(22) Filed: May 24, 2007

(65) Prior Publication Data

US 2008/0179405 A1    Jul. 31, 2008

Related U.S. Application Data

(60) Provisional application No. 60/898,203, filed on Jan. 30, 2007.

(51) Int. Cl.
*G06F 19/00* (2006.01)
(52) U.S. Cl. .................. 235/385; 235/454; 235/462.01; 235/487
(58) Field of Classification Search ............... 235/494, 235/385, 454, 462.01, 487
See application file for complete search history.

(56) References Cited

U.S. PATENT DOCUMENTS

| 4,243,734 | A | * | 1/1981 | Dillon | 430/8 |
| 4,329,393 | A | * | 5/1982 | LaPerre et al. | 428/325 |
| 5,895,075 | A | * | 4/1999 | Edwards | 283/81 |

\* cited by examiner

*Primary Examiner*—Seung H Lee
*Assistant Examiner*—Christopher Stanford
(74) *Attorney, Agent, or Firm*—Kirschstein, et al.

(57) ABSTRACT

A microdot tag for identifying a product, includes a substrate having a miniature marking portion for application to the product, and a handle portion larger in size than the marking portion to enable a user to manually hold the tag by the handle portion. A microdot containing indicia for identifying the product is applied on the marking portion. A frangible portion on the substrate between the marking portion and the handle portion, is provided for enabling the handle portion to be and remain attached to the marking portion during the application of the marking portion to the product, and for detaching the handle portion from the marking portion after the application of the marking portion to the product.

25 Claims, 2 Drawing Sheets

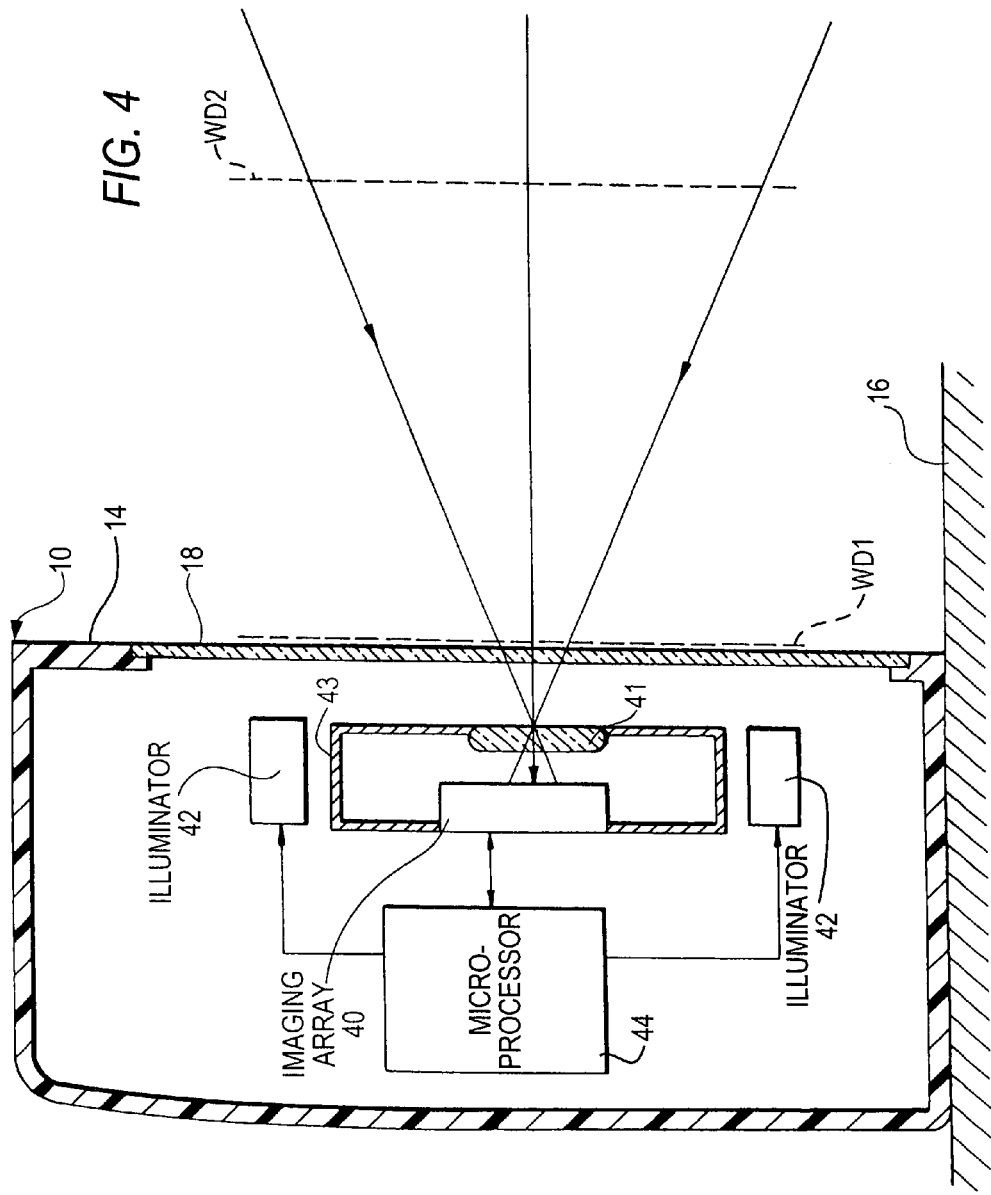

MICRODOT TAG

CROSS REFERENCE TO RELATED APPLICATION

This application claims the priority of U.S. patent provisional application Ser. No. 60/898,203, filed Jan. 30, 2007.

BACKGROUND OF THE INVENTION

1. Field of the Invention

The present invention generally relates to microdot tags and, more particularly, to making and handling a microdot tag, as well as marking a product with a microdot to identify the product.

2. Description of the Related Art

Microdots are small, usually from a few microns to less than a few millimeters in size, and one or more microdots are applied to a product for identification purposes, such as the identity of the rightful, registered owner of the product, or whether the product is authentic and not counterfeit or gray market goods. Each microdot includes a substrate that carries a unique identifier such as a specific serial number to enable a subsequent finder of a microdot-bearing product to identify the origin and/or owner of the product. One or more microdots are typically adhesively placed discretely, and sometimes openly, at numerous locations on various items of personal property on the premise that one or more of these microdots will be subsequently examined, thereby revealing the correct ownership and/or origin of the items of personal property.

It is known from U.S. Pat. No. 4,243,734 to configure a microdot as a square having a side dimension on the order of 0.007 inch. Each microdot includes indicia of the identity of the owner. It is further known from U.S. Pat. No. 4,763,928 to cut small coded disks from a strip of plastic to allow a person to apply the coded disks to an item.

As advantageous as these known microdots have been in reducing product forgeries and combating theft, their small size makes them difficult to handle. A pair of miniature tweezers, such as conventional watch repair tweezers, is typically used to apply the microdot to the product. However, applying the microdot even with the aid of tweezers requires a high degree of care and skill, which may not be present in an individual attempting to apply and maneuver the microdot into the correct position on the product.

SUMMARY OF THE INVENTION

One feature of this invention resides, briefly stated, in a microdot tag for identifying a product. The tag includes a substrate having a miniature marking portion for application to the product, and a handle portion larger in size than the marking portion to enable a user to manually hold the tag by the handle portion. A microdot is provided on the marking portion. The microdot contains machine- and/or human-readable indicia for identifying the product. For example, the machine-readable indicia may be a one- or two-dimensional symbol readable by a laser-based electro-optical reader that includes a scanner for sweeping a laser beam across the symbol, and a photodiode having a field of view and acting as a detector to detect laser light of variable intensity reflected or scattered from the symbol. The reader can also sweep the field of view. Another type of electro-optical reader employs an imaging array of photosensors, such as a one- or two-dimensional charge coupled device (CCD) or a complementary metal oxide semiconductor (CMOS) device, typically used in digital cameras, operative for capturing light returning from the symbol and for reading the symbol.

The tag further includes a frangible portion provided on the substrate between the marking portion and the handle portion. The frangible portion enables the handle portion to be and remain attached to the marking portion during the application of the marking portion to the product, and also enables the handle portion to be detached from the marking portion after the application of the marking portion to the product.

Preferably, an adhesive backing is provided on the substrate, and a removable release sheet initially covers and protects the adhesive backing. After removal of the release sheet, the exposed adhesive on the marking portion adheres the latter to the product. Advantageously, the handle portion carries data related to the indicia. Some of this data may be pre-printed, and other of this data may correspond to the indicia.

At least one of the indicia and the marking portion may be constituted from an ultraviolet (UV) light-responsive material. For example, the indicia may be printed with a UV ink that fluoresces in the visible spectrum under UV light. Fluorescence is the property of emitting electromagnetic radiation (e.g., visible light) resulting from and occurring only during the absorption of radiation from another source (e.g., UV light). Further, some inks are transparent and non-fluorescing to visible light, thus allowing a symbol or marking to be provided which is invisible to human sight under normal lighting conditions. Such invisible symbols could be used where a normal (i.e., human visible) symbol is undesirable, either for appearance or for security reasons.

In a preferred embodiment, the marking portion has a generally circular shape with a diameter. The handle portion extends lengthwise along a longitudinal direction and has a gripping part with a transverse dimension greater than the diameter of the circular marking portion, and a tapered part with a transverse dimension that decreases along the longitudinal direction away from the gripping part. The frangible portion has a transverse dimension smaller than transverse dimensions of the handle and marking portions. A score line for weakening the frangible portion is advantageously provided.

In accordance with another feature of this invention, a method of making the microdot tag for product identification, is performed by forming the substrate with the miniature marking portion for application to the product, and with the handle portion larger in size than the marking portion to enable a user to manually hold the tag by the handle portion. The microdot containing the indicia for identifying the product is applied to the marking portion. The substrate is weakened with the frangible portion between the marking portion and the handle portion. The frangible portion enables the handle portion to be and remain attached to the marking portion during the application of the marking portion to the product, and also enables the handle portion to be detached from the marking portion after the application of the marking portion to the product.

In accordance with still another feature of this invention, a method of identifying the product with the microdot tag, is performed by forming the substrate with the miniature marking portion, the handle portion larger in size than the marking portion, and the frangible portion between the marking portion and the handle portion. The microdot containing the indicia for identifying the product is applied to the marking portion. Then, the substrate is manually held by the handle portion, and the marking portion is applied to the product.

Next, the frangible portion is torn to detach the handle portion from the marking portion after the marking portion has been applied to the product.

Hence, the small size of the microdots no longer makes them difficult to handle, because the handle portion, and not a pair of miniature tweezers, is used to apply the microdot to the product. A high degree of care and skill on the part of the individual attempting to apply and maneuver the microdot into the correct position on the product is no longer required.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 4 is a schematic diagram of a portable, electro-optical imager for reading indicia on a marking portion of the tag of FIG. 1 on the product to be identified in accordance with this invention.

DETAILED DESCRIPTION OF THE PREFERRED EMBODIMENTS

Figure 1:
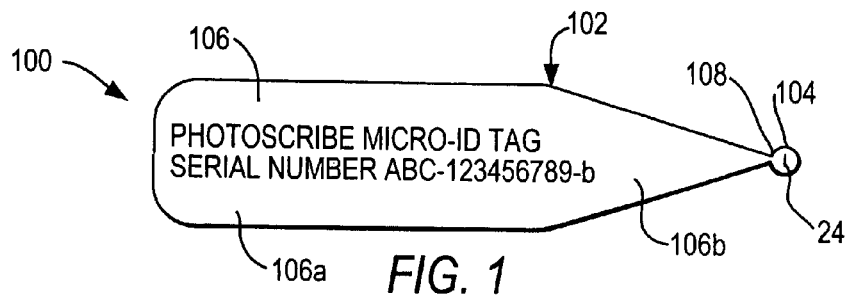
FIG. 1 is a top plan view of a microdot tag for identifying a product in accordance with this invention.
Figure 2:
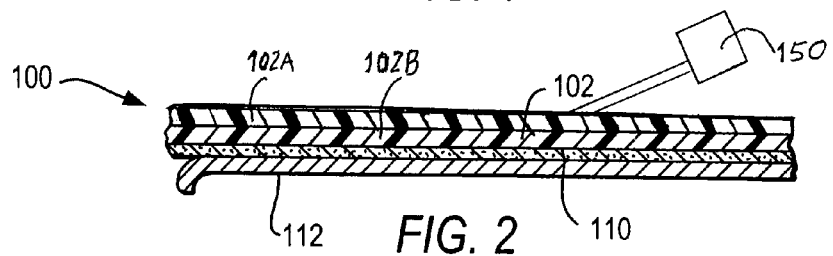
FIG. 2 is a side view of the tag of FIG. 1.

Reference numeral 100 in FIG. 1 generally identifies a microdot tag for identifying a product 70 (see FIG. 2). The tag 100 includes a substrate 102 having a miniature marking portion 104 for application to the product 70 in any desired location thereon, and a handle portion 106 larger in size than the marking portion 104 to enable a user to manually hold the tag by the handle portion 106.

A microdot 24 is provided on the marking portion 104. The microdot 24 contains machine- and/or human-readable indicia for identifying the product 70, for example, by its serial number, product name, product location, product description, product image, product owner, product distributor, product manufacturing date, etc. The indicia may be printed on or laser-etched into the marking portion 104. For example, the machine-readable indicia 24 may be a one- or two-dimensional symbol readable by a laser-based electro-optical reader (see discussion of FIG. 3 below) that includes a scanner for sweeping a laser beam across the symbol, and a photodiode having a field of view and acting as a detector to detect laser light of variable intensity reflected or scattered from the symbol. The reader can also sweep the field of view. Another electro-optical reader (see discussion of FIG. 4 below) employs an imaging array of photosensors, such as a one- or two-dimensional charge coupled device (CCD) or a complementary metal oxide semiconductor (CMOS) device, typically used in digital cameras, operative for capturing light returning from the symbol and for reading the symbol.

The tag 100 further includes a frangible portion 108 or narrow neck provided on the substrate 102 between the marking portion 104 and the handle portion 106. The frangible portion 108 enables the handle portion 106 to be and remain attached to the marking portion 104 during the application of the marking portion 104 to the product 70, and also enables the handle portion 106 to be detached from the marking portion 104 after the application of the marking portion 104 to the product 70.

As best seen in FIG. 2, an adhesive backing 110 is provided on the substrate 102, and a removable release sheet 112 initially covers and protects the adhesive backing 110. After removal of the release sheet 112 by peeling as represented by the curled edge, the exposed adhesive on the marking portion 104 adheres the latter to the product. The frangible portion is strong enough not to be torn during removal of the release sheet.

Advantageously, the handle portion 106 carries data related to the indicia 24. Some of this data may be pre-printed, such as a company name or logo, and other of this data may correspond to the indicia 24. For example, the serial number of the product may be encoded in the indicia to be read by an electro-optical reader, and the same serial number may be printed in, for example, human-readable Arabic numerals in large type to visibly advise a user of the information encoded in the indicia without having to rely on special equipment or magnifiers. The handle portion 106 may be discarded after being torn from the marking portion, or preferably, is saved and stored in a permanent record, for example, on a certificate of authenticity.

At least one of the indicia 24 and the marking portion 104 may be constituted from an ultraviolet (UV) light-responsive material. For example, the indicia 24 may be printed with a UV ink that fluoresces in the visible spectrum under UV light. Fluorescence is the property of emitting electromagnetic radiation (e.g., visible light) resulting from and occurring only during the absorption of radiation from another source (e.g., UV light). Further, some inks are transparent and non-fluorescing to visible light, thus allowing a symbol or marking to be provided which is invisible to human sight under normal lighting conditions. Such invisible symbols could be used where a normal (i.e., human visible) symbol is undesirable, either for appearance or for security reasons.

In a preferred embodiment, the marking portion 104 has a generally circular shape with a diameter. The handle portion 106 extends lengthwise along a longitudinal direction and has a gripping part 106a with a transverse dimension greater than the diameter of the circular marking portion 104, and a tapered part 106b with a transverse dimension that decreases along the longitudinal direction away from the gripping part 106a. The frangible portion 108 has a transverse dimension smaller than transverse dimensions of the handle and marking portions and has the smallest transverse dimension. A score line, a crease or a series of perforations formed by a mechanical cutter or a laser, for weakening the frangible portion, is advantageously provided across the frangible portion 108.

In accordance with another feature of this invention, a method of making the microdot tag 100 for product identification, is performed by forming the substrate 102 with the miniature marking portion 104 for application to the product 70, and with the handle portion 106 larger in size than the marking portion 104 to enable a user to manually hold the tag by the handle portion 106. A cutting laser may be used to form the substrate with these portions. A microdot containing the indicia 24 for identifying the product 70 is applied to the marking portion 104. The substrate is weakened by the frangible portion 108 between the marking portion and the handle portion. The frangible portion 108 enables the handle portion 106 to be and remain attached to the marking portion 104 during the application of the marking portion to the product, and also enables the handle portion 106 to be detached from the marking portion 104 after the application of the marking portion to the product.

In accordance with still another feature of this invention, a method of identifying the product with a microdot tag, is performed by forming the substrate 102 with the miniature marking portion 104, the handle portion 106 larger in size than the marking portion, and the frangible portion 108 between the marking portion and the handle portion. The microdot containing the indicia 24 for identifying the product 70 is applied to the marking portion. Then, the substrate 102 is manually held by the handle portion 106, and the marking portion 104 is applied to the product. Next, the frangible portion 108 is torn to detach the handle portion 106 from the marking portion 104 after the marking portion has been applied to the product.

Figure 3:
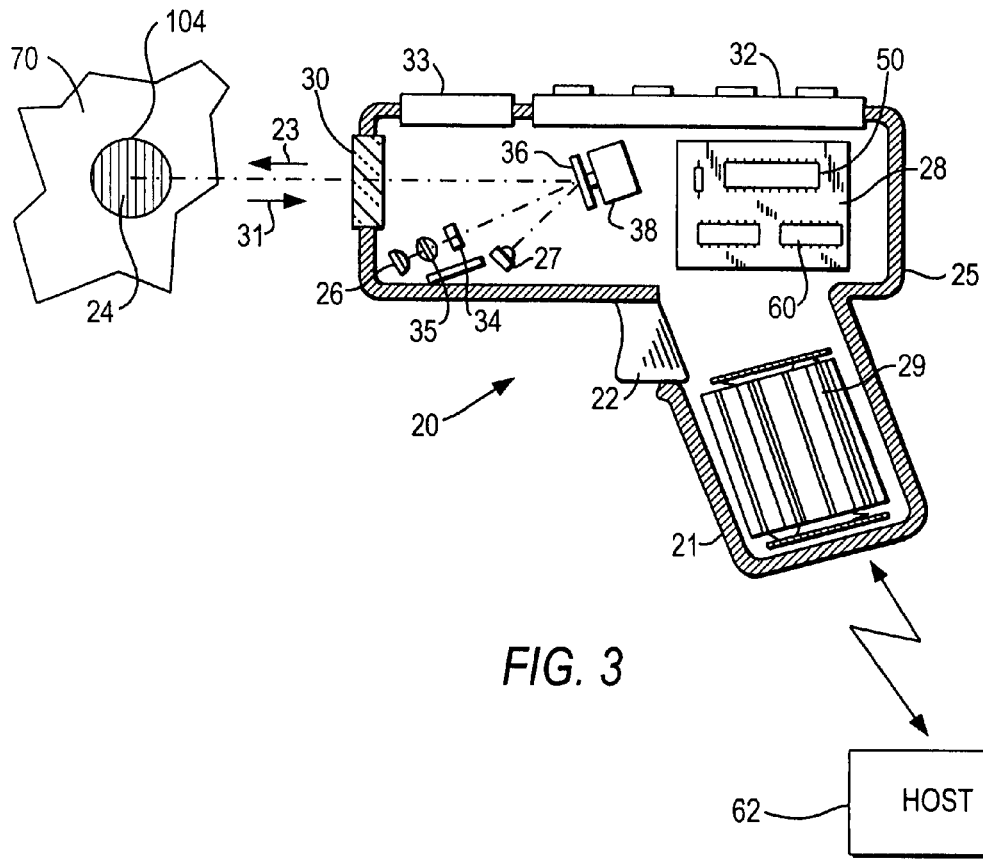
FIG. 3 is a schematic diagram of a moving beam, hand-held, electro-optical reader for reading indicia on a marking portion of the tag of FIG. 1 on the product to be identified in accordance with this invention.

Reference numeral 20 in FIG. 3 generally identifies a hand-held reader for electro-optically reading the indicia 24, such as a bar code symbol, or other marking, located in a range of working distances therefrom. The indicia 24 is printed on the marking portion with an ink that is responsive to visible laser light or to ultraviolet (UV) light that lies in the 180 to 400 nanometer wavelength region of the electromagnetic spectrum. The ink has the property of either reflecting the light incident thereon, or fluorescing as visible light upon exposure to the UV light. The UV light will help law enforcement personnel in finding exactly where the marking portion is located on the product.

The reader 20 has a pistol grip handle 21 and a manually actuatable trigger 22 which, when depressed, enables a light beam 23 to be directed at the symbol 24. The reader 20 includes a housing 25 in which a visible or a UV light source 26, a light detector 27, signal processing circuitry 28, and a battery pack 29 are accommodated. A light-transmissive window 30 at a front of the housing enables the light beam 23 to exit the housing, and allows light 31 (either UV light or visible light) scattered off the symbol to enter the housing. A keyboard 32 and a display 33 may advantageously be provided on a top wall of the housing for ready access thereto.

In use, an operator holding the handle 21 aims the housing at the symbol and depresses the trigger. The light source 26 emits the light beam 23 which is optically modified and focused by an optical focusing assembly 35 to form a beam spot on the symbol 24. The beam passes through an optical filter 34 to a scan mirror 36 which is repetitively oscillated at a scan rate of at least 20 scans a second by a motor drive 38. The scan mirror 36 reflects the beam incident thereon to the symbol 24 and sweeps the beam spot across the symbol in a scan pattern. The scan pattern can be a line extending lengthwise along the symbol along a scan direction, or a series of lines arranged along mutually orthogonal directions, or an omnidirectional pattern, just to name a few possibilities.

The reflected light 31 has a variable intensity over the scan pattern and passes through the window 30 onto the scan mirror 36 where it is reflected onto the photodetector 27 for conversion to an analog electrical signal. As known in the art, the signal processing circuitry 28 including a microprocessor or controller 50 digitizes and decodes the signal to extract the data encoded in the symbol.

Reference numeral 10 in FIG. 4 generally identifies a portable imager for electro-optically reading indicia, such as the bar code symbol 24, or other marking. The imager 10 includes an imaging array 40 and an imaging lens assembly 41 mounted in an enclosure 43. The array 40 is a solid-state device, for example, a CCD or a CMOS imager and has a multitude of addressable image sensors operative for capturing light through a window 18 from the symbol over a field of view and located in a working range of distances between a close-in working distance (WD1) and a far-out working distance (WD2). The window 18 is mounted on a housing 14 that rests on a generally planar support surface 16 in a hands-free mode of operation. The housing 14 may be lifted off the surface 16 and held in one's hand during a hand-held mode of operation. In a preferred embodiment, WD1 is about two inches from the array 40 and generally coincides with the window 18, and WD2 is about eight inches from the window 18. An illuminator 42 is also mounted in the imager 10 and preferably includes a plurality of visible or UV light sources, e.g., light emitting diodes (LEDs), arranged at opposite sides of the array 40 to uniformly illuminate the symbol 24.

As also shown in FIG. 4, the array 40 and the illuminator LEDs 42 are operatively connected to a controller or microprocessor 44 operative for controlling the operation of these components. Preferably, the microprocessor is the same as the one used for decoding light scattered from the indicia and for processing the captured target images. In operation, the microprocessor 44 sends a command signal to pulse the illuminator LEDs 42 for a short time period, say 500 microseconds or less, and energizes the array 40 to collect light from a target symbol only during said time period. A typical array needs about 33 milliseconds to read the entire target image and operates at a frame rate of about 30 frames per second. The array may have on the order of one million addressable image sensors.

In addition, the controllers 50,44 may be operatively connected, preferably via a wireless transceiver 60, to a host 62. The host 62 has a centralized database in which the indicia and the corresponding identity information, such as the name of the registered owner, are stored for retrieval and display on the display 32.

It will be understood that each of the elements described above, or two or more together, also may find a useful application in other types of constructions differing from the types described above.

While the invention has been illustrated and described as embodied in microdot tags to be read by electro-optical readers, it is not intended to be limited to the details shown, since various modifications and structural changes may be made without departing in any way from the spirit of the present invention.

For example, the substrate 102 need not be a single layer as described above, but instead, can be a laminate composed of a plurality of layers 102a, 102b. In a preferred embodiment, an upper and a lower layer of different colors are provided. A laser forms the indicia by etching through the upper layer, thereby exposing the lower layer with the indicia. The substrate 102 could also be formed of a black anodized aluminum, in which a laser would remove the black outer surface, thereby exposing the silvery color of the aluminum. The substrate 102 can also be formed on a material which changes color when exposed to laser irradiation.

In another variant construction, each tag may be provided with a plurality of marking portions, each having its own microdot. Thus, rather than providing a marking portion 104 at one end of the tag, another marking portion could be provided at the same one end, or at an opposite end of the tag. Additional marking portions may be provided in the middle of the tag. All of the marking portions are connected to the handle portion by a frangible portion.

In a particularly preferred embodiment, a laser 150, as shown in FIG. 2, that forms the indicia on the marking portion 104 and/or the handle portion 106 is the same laser that cuts the tag 100 out from a blank sheet of material. In one embodiment, the laser beam may have a higher intensity during the time that the tag 100 is cut, as compared to a lower intensity during the time that the tag 100 is marked. In another embodiment, the laser beam has the same intensity during cutting and marking, in which event, the marking may be accomplished in a plurality of passes.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

I claim:

1. A microdot tag for identifying a product, comprising:
   a substrate having a miniature marking portion for application to the product, and a handle portion extending lengthwise along a longitudinal direction, the handle portion having a gripping part with a transverse dimension larger in size than a transverse dimension of the marking portion to enable a user to manually hold the tag by the gripping part, and a tapered part with a transverse dimension that decreases along the longitudinal direction away from the gripping part;
   a frangible portion on the substrate between the marking portion and the handle portion, for enabling the handle portion to be and remain attached to the marking portion during the application of the marking portion to the product, and for detaching the handle portion from the marking portion after the application of the marking portion to the product; and
   a microdot provided on an outer exterior surface of the marking portion, the microdot containing indicia exposed at the outer exterior surface of the marking portion for identifying the product both before and after the handle portion has been detached.

2. The tag of claim 1, and an adhesive backing on the substrate, and a removable release sheet covering the adhesive backing.

3. The tag of claim 1, wherein at least one of the indicia and the marking portion is constituted from an ultraviolet (UV) light-responsive material.

4. The tag of claim 1, wherein the indicia is one of a machine-readable information and a human-readable information.

5. The tag of claim 1, wherein the handle portion carries data related to the indicia.

6. The tag of claim 1, wherein the marking portion has a generally circular shape with a diameter, and wherein the transverse dimension of the gripping part is greater than the diameter of the circular marking portion.

7. The tag of claim 1, wherein the frangible portion has a transverse dimension smaller than the transverse dimensions of the gripping part and marking portion.

8. The tag of claim 1, and a score line for weakening the frangible portion.

9. The tag of claim 1, wherein the substrate has a plurality of layers.

10. The tag of claim 1, wherein the substrate has another marking portion.

11. A method of making a microdot tag for product identification, comprising the steps of:
    forming a substrate with a miniature marking portion for application to the product, and with a handle portion extending lengthwise along a longitudinal direction, the handle portion having a gripping part with a transverse dimension larger in size than a transverse dimension of the marking portion to enable a user to manually hold the tag by the gripping part, and a tapered part with a transverse dimension that decreases along the longitudinal direction away from the gripping part;
    weakening the substrate with a frangible portion between the marking portion and the handle portion, to enable the handle portion to be and remain attached to the marking portion during the application of the marking portion to the product, and to detach the handle portion from the marking portion after the application of the marking portion to the product; and
    providing a microdot on an outer exterior surface of the marking portion, the microdot containing indicia exposed at the outer exterior surface of the marking portion for identifying the product both before and after the handle portion has been detached.

12. The method of claim 11, and applying an adhesive backing on the substrate, and covering the adhesive backing with a removable release sheet.

13. The method of claim 11, and constituting at least one of the indicia and the marking portion from an ultraviolet (UV) light-responsive material.

14. The method of claim 11, and constituting the indicia as one of a machine-readable information and a human-readable information.

15. The method of claim 11, and providing data related to the indicia on the handle portion.

16. The method of claim 11, wherein the forming step is performed by forming the marking portion with a generally circular shape having a diameter, and forming the transverse dimension of the gripping part to be greater than the diameter of the circular marking portion.

17. The method of claim 11, and forming the frangible portion with a transverse dimension smaller than the transverse dimensions of the gripping part and marking portion.

18. The method of claim 11, and wherein the weakening step is performed by scoring the frangible portion.

19. The method of claim 11, wherein the forming step is performed by forming the substrate with another marking portion.

20. The method of claim 11, wherein the forming step is performed by forming the substrate with a plurality of layers.

21. The method of claim 11, wherein the forming step and the providing step are performed by a laser.

22. A method of identifying a product with a microdot tag, comprising the steps of:
    forming a substrate with a miniature marking portion, a handle portion extending lengthwise along a longitudinal direction and having a gripping part with a transverse dimension larger in size than a transverse dimension of the marking portion, and a tapered part with a transverse dimension that decreases along the longitudinal direction away from the gripping part, and a frangible portion between the marking portion and the handle portion;
    manually holding the substrate by the gripping part of the handle portion;
    applying the marking portion to the product;
    tearing the frangible portion to detach the handle portion from the marking portion after the marking portion has been applied to the product; and
    providing a microdot on an outer exterior surface of the marking portion, the microdot containing indicia exposed at the outer exterior surface of the marking portion for identifying the product both before and after the handle portion has been detached.

23. The method of claim 22, wherein the step of applying the marking portion is performed by adhering the marking portion to the product.

24. The method of claim 22, and providing data related to the indicia on the handle portion.

25. The method of claim 22, wherein the tearing step is performed by pre-weakening the frangible portion.

* * * * *